United States Patent [19]

Wirth

[11] 3,882,701

[45] May 13, 1975

[54] LOCKING LATCH FOR A DISK CARTRIDGE

[75] Inventor: Wayne M. Wirth, North Saint Paul, Minn.

[73] Assignee: Minnesota Mining and Manufacturing Company, Saint Paul, Minn.

[22] Filed: Nov. 28, 1973

[21] Appl. No.: 419,711

[52] U.S. Cl. .................. 70/63

[51] Int. Cl. .................. E05b 65/48

[58] Field of Search ........ 70/63, 208, 210; 206/444; 220/55 L

[56] References Cited

UNITED STATES PATENTS

| | | | |
|---|---|---|---|
| 1,995,338 | 3/1935 | Andrews | 70/208 X |
| 3,465,875 | 9/1969 | McKelver | 206/444 |
| 3,754,421 | 8/1973 | Wirth | 70/63 |
| 3,785,184 | 1/1974 | Wirth | 70/63 |

*Primary Examiner*—Robert L. Wolfe

*Attorney, Agent, or Firm*—Alexander, Sell, Steldt & DeLaHunt

[57] ABSTRACT

A lockable latch mechanism for the top and bottom covers of a recording disk cartridge. When the covers are closed a projection on the bottom cover extends through the hub of the recording disk into a latch assembly on the top cover. A handle on the top cover may be moved to a closed position to cam balls in the latch assembly to a position beneath an enlarged head on the projection, thereby latching the covers together. A key operated lock may then be operated to lock the handle in its closed position.

4 Claims, 6 Drawing Figures

PATENTED MAY 1 3 1975 3,882,701

LOCKING LATCH FOR A DISK CARTRIDGE

Background of the Invention

This invention relates to lockable latch mechanisms for closing storage containers.

A disk cartridge containing a single recording disk has been developed as a data storage device for use in peripheral equipment for a computer. Such a cartridge is the Model 5440 cartridge manufactured by International Business Machines Corp., White Plains, N.Y.

This cartridge has a magnetic catch and mechanical release but does not provide means for locking the storage container. Such locking may be desirable to restrict access to the data on the disk. Also disk-packs stored in a common location which have separately keyed locks can be positively identified by the keys used to open them.

Other prior art related to this application, in that they disclose lockable latch mechanisms for containers, are my U.S. Pat. Nos. 3,754,421 and 3,736,777, and U.S. Pat. Applications Nos. 292,488 and now U.S. Pat. No. 3,785,184 and 347,188.

SUMMARY OF THE INVENTION

A disk cartridge according to the present invention has a latch including a key operated lock for restricting access to the disk, which latch is particularly adapted for use on the International Business Machines Corp. Model 5440 cartridge.

According to the present invention there is provided a cartridge for a recording disk having a hub with a central opening. The cartridge includes top and bottom covers coupled by a releasable latch operated by a handle mounted on the top cover for movement between open and closed positions. A centrally positioned projecton on the bottom cover has an enlarged end adapted to pass through the central opening in the hub and engage a latch assembly centered on the top cover when the top and bottom covers are mated. A plurality of balls are mounted in the latch assembly for radial movement relative to the projection between inner engaged positions against the projection on the side of the enlarged end adjacent the bottom cover, and outer release positions spaced from the projection to afford movement of the enlarged end therebetween to separate or mate the covers. A cam coupled to the handle is shaped to move the balls to their engaged position when the handle is moved to its closed position, and to afford movement of the balls to their release position when the handle is in its open position. A key operated pin tumbler lock mechanism is provided and may be operated to engage a bolt with the handle and retain the handle in its close position, thereby locking the cartridge.

BRIEF DESCRIPTION OF THE DRAWING

The invention will be further described with reference to the accompanying drawing wherein like numbers refer to like parts in the several views, and wherein.

DESCRIPTION OF THE PREFERRED EMBODIMENT

Figure 1:
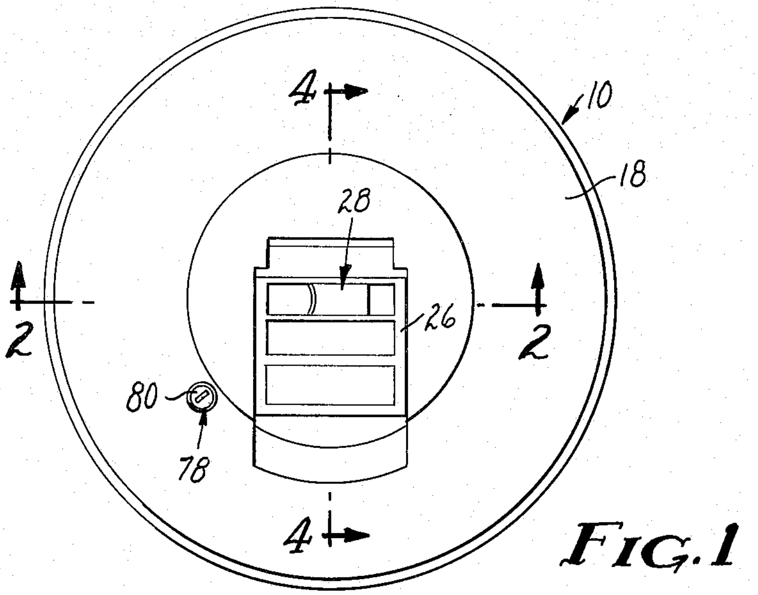
FIG. 1 is a plan view of a cartridge for a recording disk having a lockable latching mechanism according to the present invention.

Referring now to the drawing, there is shown a disk cartridge including a lockable latching mechanism according to the present invention, generally designated by the reference numeral 10. Except for the addition of the lockable latching mechanism, the disk pack cartridge 10 is generally the same as the cartridge sold under the trade designation "5440" by the International Business Machines Corporation, the characteristics of which are described in production reference literature entitled "Reference Manual, IBM 5440 Disk Cartridge Requirements" available from International Business Machines Corporation, Commercial Development, Armonk, N.Y., 10504, the contents of which are incorporated herein by reference.

The cartridge 10 includes disk assembly 12 consisting of a single recording disk 14 supported on a hub 16. The disk assembly 12 is enclosed in a protective top cover 18. During use on a disk drive for a computer (not shown) both the disk assembly 12 and top cover 18 are attached thereto. The disk assembly 12 rotates within the stationary top cover 18 which has openings (not shown) affording entry of read/write heads of the disk-drive. For storage, the top cover 18 nests in a dish like bottom cover 22 which has a plurality of permanent magnets 24 positioned to contact and adhere to the magnetizable hub 16.

Figure 2:
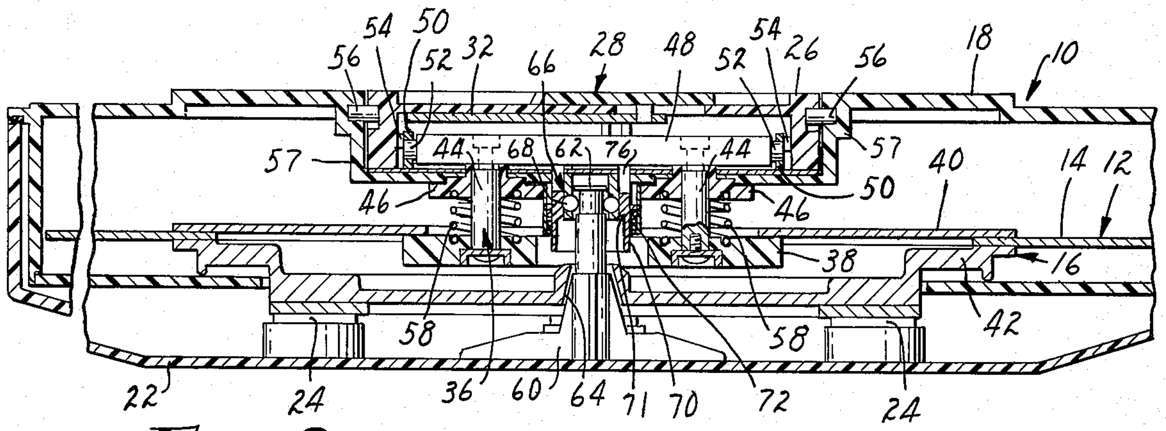
FIG. 2 is an enlarged sectional view taken approximately along lines 2—2 of FIG. 1.

The bottom cover 22 can be removed by manually pivoting a handle 26 on the top cover 18 from a closed position (FIGS. 1, 2 and 4) to an open position (FIG. 3) provided that when the handle 26 is in its closed position a slide assembly 28 in the handle 26 is manually slid against the bias of a spring 30 to engage a projection 32 on the slide assembly 28 under a tab 34 on a draw plate assembly 36. When the handle 26 is thus coupled to the draw plate assembly 36, movement of the handle 26 to its open position moves the disk assembly 12 axially toward the handle 26 relative to the top cover 18, thereby moving the hub 16 away from and into a weak flux field for the permanent magnets 24 to allow the bottom cover 22 to be easily separated from the top cover 18.

The draw plate assembly 36 includes a circular draw plate 38 enclosed within a cavity defined by a circular top plate 40 and a dished bottom plate 42 which form the hub 16. Attached to the draw plate 38 are parallel rods 44 extending through a central opening in the top plate 40 of the hub 16. The rods 44 slidably engage cylindrical bearings 46 in the top cover 18, and are each attached to opposite ends of a bar 48 located in a recess for the handle 26 on the outer surface of the top cover 18. A U-shaped bracket 50 is pivotally mounted on pins 52 extending from opposite ends of the bar 48, and carries the tab 34 which is centrally positioned along the bar 48. The handle 26 is pivotally mounted on a pair of pins 54 at the ends of the bracket 50 which extend beyond the bar 48, and on pins 56 which are fixed in walls 57 of the top cover 18 which form the handle recess. When the slide assembly 28 is not positioned to engage the tab 34 and the handle is either in its closed position, or pivoted to its open position (requiring only slight rotation of the bracket 50 due to nonalignment of the pins 54 and 56), the draw plate assembly 36 remains in an engage position with the bar 48 against the outer surface of the top cover 18 to which it is biased by springs 58 about the rods 44 positioned between the hub 16 and the top cover 18. In the engage position the hub 16 can contact the permanent magnets 24 in the bottom cover 22 to provide magnetic coupling therebetween. When, however, the slide assembly 28 engages the tab 34 and the handle 26 is then moved from its closed to its open position, the bracket 50 must rotate with the handle 26 about the pins 52 in the bar 48. This causes the end of the handle 26 adjacent the top cover 18 to slide under the bar 48 lifting the bar away from the top cover 18 against the bias of the springs 58, and thereby the disk assembly 12 toward the handle 26 and away from the permanent magnets 24 to afford separation of the bottom cover 22.

The addition according to the present invention to the previously described magnetic catch and mechanical release mechanism provides positive mechanical engagement between the covers which can be engaged or released by manual operation of the handle between its closed and open positions in the manner previously indicated.

A centrally positioned projection 60 on the bottom cover 22 has an enlarged button-like end 62 sized to pass through a central opening 64 in the hub 16 and engage a latch assembly 66 in the top cover 18 when the top and bottom covers 18 and 22 are mated. The latch assembly 66 includes a central opening for receiving the projection 60 which is coaxial with the top cover 18. A plurality of bearing balls 68 are circularly disposed about the central opening, and are constrained in the latch assembly 66 for limited movement radially of the top cover 18. A cam sleeve 70 having a stepped cylindrical inner surface extends around the balls 68. The cam sleeve 70 is mounted for limited movement axially of the latch assembly 66 from a first position (FIG. 3), to which the cam sleeve 70 is biased by a spring 72, with a portion of the sleeve 70 adjacent the balls 68 which has an inner diameter sufficiently large to allow the balls 68 to move radially outwardly and permit passage of the enlarged end 62 of the projection 60 therebetween; to a second position (FIG. 2) to which the cam sleeve 70 may be pressed against the bias of the spring 72 with a portion of the sleeve 70 adjacent the balls 68 which has a smaller inner diameter sized to press the balls 68 inwardly and into engagement with the projection 60 under the enlarged end 62 when the covers 18 and 22 are mated. The sleeve 70 has a camming surface 71 which will move the balls 68 inwardly during movement thereof to its second position.

When the draw plate assembly 36 is in its engage position (FIG. 2) the bar 48 engages a pair of projections 76 from the end of the cam sleeve 70 and presses it to its second position, the springs 58 for the draw plate assembly 36 being sufficiently forceful to overpower the spring 72 for the latch assembly 66. When, however, the draw plate assembly 36 is moved to its release position (by engaging the handle 26 therewith and moving it to its open position in the manner previously described) the bar 48 is spaced from the projections 76 so that the spring 72 moves the cam sleeve 70 to its first position, thereby allowing separation of the covers 18 and 22.

A mechanism is provided for locking the handle 26 in its closed position. Mounted in the top cover 82 is a conventional pin tumbler lock mechanism 78 including a key operated plug 80 rotatable between locked and unlocked positions. A bolt 82 is coupled to the plug 80. The bolt 82 includes a plate-like end 84 slidably mounted in a bracket on the top cover 18. The plate 84 is attached to a rod 86 having an end in an opening in the adjacent wall 57. The plug 80 includes a pin 88 eccentrically located on its end and projecting through a cam opening in the plate 84. The cam opening is shaped so that when the handle 26 is closed, rotation of the plug 80 to its locked position will move the end of the rod 86 into a close fitting opening 90 in the handle 26. A second bolt 92 is slidably mounted inside the handle 26. The second bolt 92 includes a centrally attached plate 93 which is movable between two ribs of the handle 26, thereby limiting movement of the second bolt 92 between a release position (to which it is biased by a spring 94) with its ends about flush with the sides of the handle 26 and with one end occupying the opening 90; and an engaged position with its end opposite the opening 90 projecting from the handle 26. When the handle 26 is closed and the plug 80 is locked, the rod 86 enters the opening 90 and moves the second bolt 92 to its engaged position with its end in an opening 96 in the adjacent wall 57 of the handle recess, thereby latching both sides of the handle 26.

OPERATION

Figure 3:
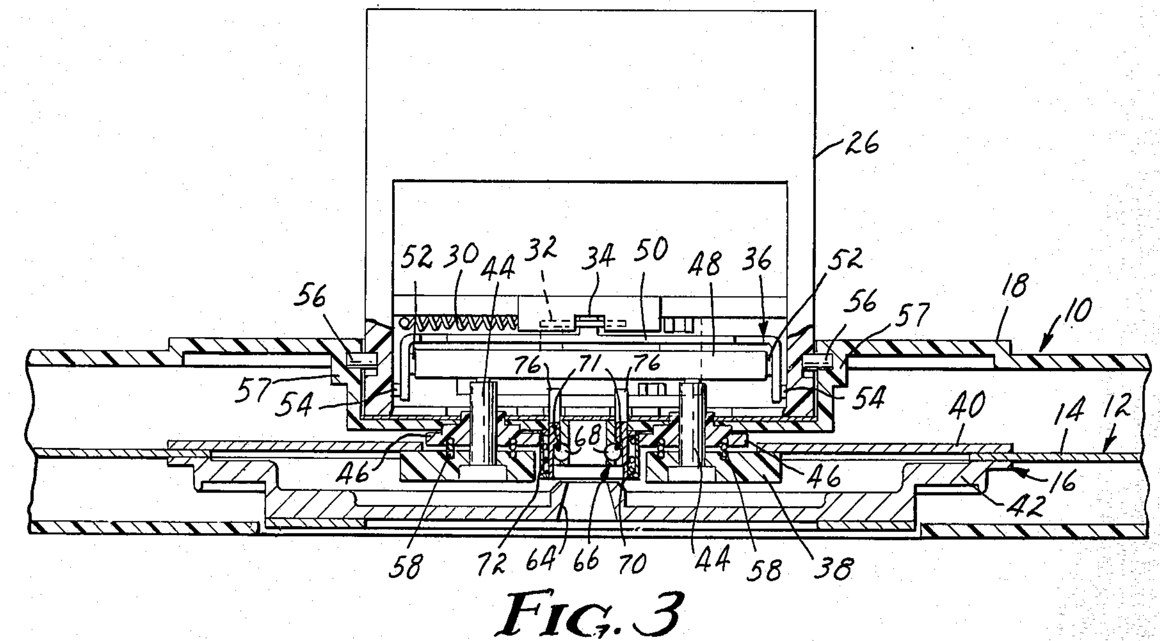
FIG. 3 is an enlarged sectional view taken approximately along the lines 2—2 of FIG. 1, but shown with a handle of the latch mechanism in its open position and a bottom cover of the container removed.
Figure 4:
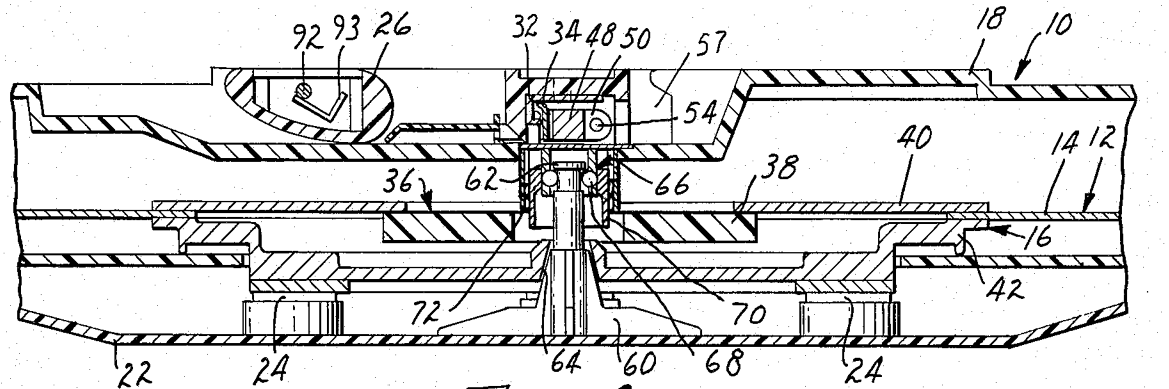
FIG. 4 is an enlarged sectional view taken approximately along lines 4—4 of FIG. 1.
Figure 5:
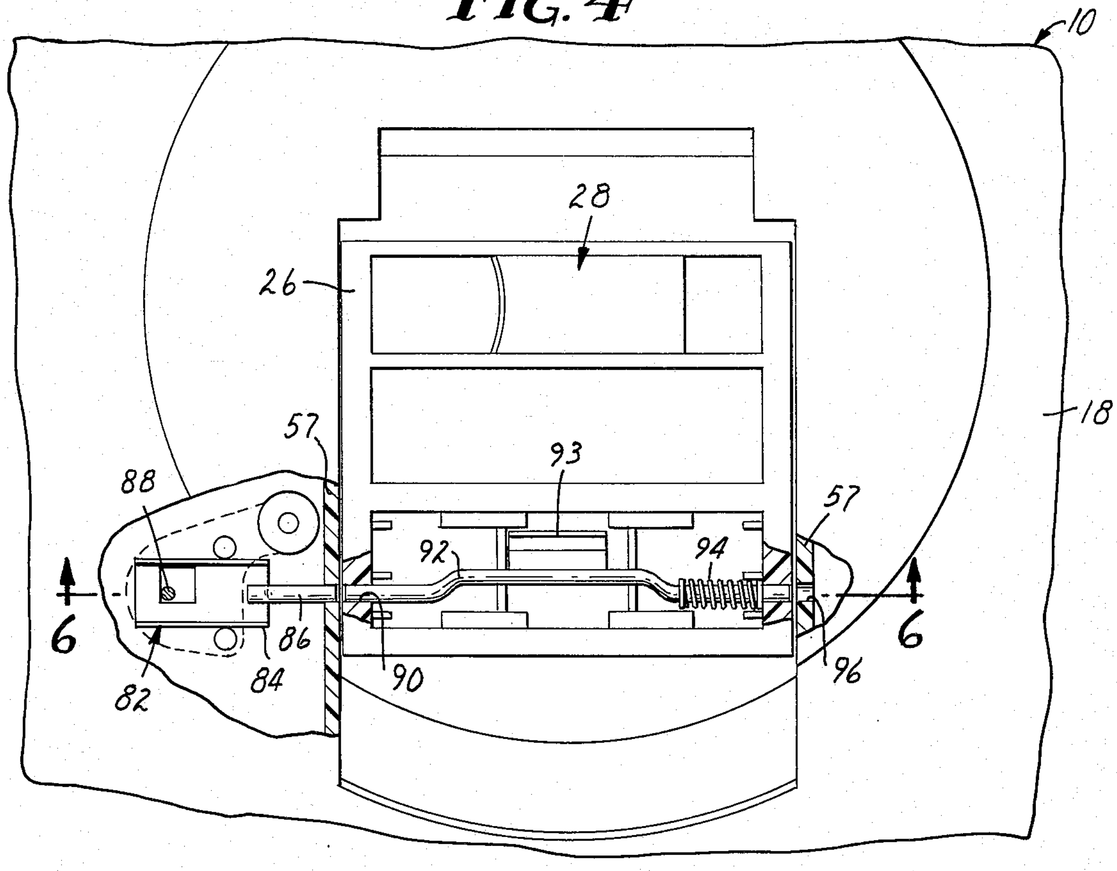
FIG. 5 is an enlarged fragmentary plan view of the lockable latching mechanism of FIG. 1 with certain parts broken away and sectioned to show detail.
Figure 6:
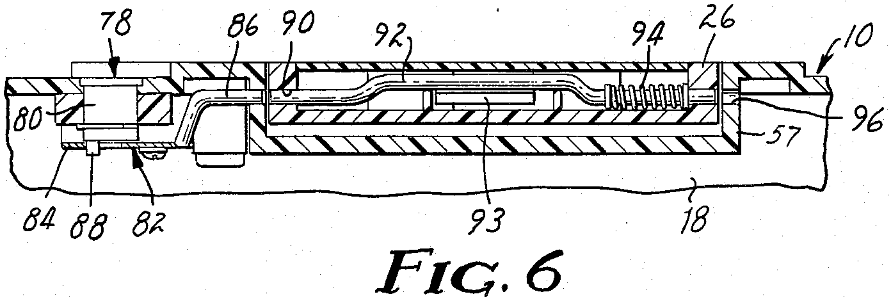
FIG. 6 is a fragmentary sectional view taken approximately along the lines 6—6 of FIG. 5.

The operation to open a closed and locked device 10 will now be described. The operator first inserts a key and rotates the plug 80, thereby withdrawing the rod 86 from the handle 26 into the top cover 18, and allowing the spring 94 to center the second bolt 92 in the handle 26. This frees the handle so that it may be removed from its closed position (FIG. 2) to its open position. Next the operator manually moves the slide assembly 28 to engage its projection 32 with a tab 34 on the bracket 50, and lifts the handle from its closed toward its open position (FIG. 3). This movement pivots the handle 26 and bracket 50 about the pins 52 in the bar and pins 56 in the top cover 18 to slide the end of the handle adjacent the top cover 18 under the bar 48, thereby lifting the bar 48 and attached draw plate 38 relative to the top cover 18 against the bias of the springs 58. The draw plate 38 engages the top plate 40 of the hub 16, moving the hub away from the permanent magnets 24 in the bottom cover 22. Additionally, movement of the bar 48 away from the top cover allows the spring 72 to lift the cam sleeve 70 to a position (FIG. 3) where its inner diameter allows the balls 68 in the top cover latch assembly 66 to move out from under the end 62 of the projection 60 on the bottom cover 22. With the magnetic and mechanical coupling between the covers 18 and 22 being thus released, the covers 18 and 22 may be separated. The covers 18 and 22 may then be closed and locked by reversing the procedure.

Having thus described the present invention, what is claimed is:

1. A cartridge for a recording disk having a hub with a central opening, said cartridge including separable mating top and bottom covers coupled by a releasable catch mechanism operable by a handle mounted on the top cover for movement between open and closed positions, wherein the improvement comprises:

a centrally positioned projection on said bottom cover having an enlarged end adapted to pass through the central opening in said hub when the covers are mated;

a latch assembly mounted centrally on said top cover and positioned for engagement by the projection, including a plurality of balls mounted therein for radial movement between inner engaged positions against the projection on the side of the enlarged end adjacent the bottom cover and outer release positions spaced from the projection to afford movement of the enlarged end therebetween; and cam means operably coupled to said handle for moving said balls to their engaged positions when said handle is moved to its closed position, and for affording movement of the balls to their release positions, when said handle is in its open position;

a pin tumbler lock mechanism including a key operated plug mounted in the top cover for rotation between locked and unlocked positions; and bolt means coupled to the plug for engaging and preventing movement of the handle from its closed position when the plug is rotated to its locked position.

2. A cartridge according to claim 1, wherein said bolt means comprise a bolt eccentrically coupled to the plug and mounted in the top cover for movement when the plug is rotated to its locked position into a position engaging the handle when the handle is in its closed position to prevent movement of the handle to its open position; and for movement when the plug is rotated to its unlocked position into a position spaced from the handle.

3. A disk cartridge according to claim 2, wherein said top cover has walls defining a recess for receiving said handle in its closed position, said bolt passes through one of said walls into an opening defined in said handle when the plug is rotated to its locked position, a second bolt is mounted in and extends across said handle, a first end of said bolt being positioned in said opening, said second bolt being slidably mounted in said handle for movement from a first position with its ends generally flush with the sides of the handle, and a second position with a second end of the second bolt projecting from the side of said handle, one of said walls adjacent said second bolt end defines an opening for receiving the second bolt end when the second bolt is in its second position, and spring means are provided for biasing said second bolt to its first position.

4. A disk cartridge comprising a single recording disk and hub assembly enclosed in a protective top cover and catch means releasably attaching a removable bottom cover, said hub being of magnetizable material and said catch means comprising a plurality of permanent magnets on the bottom cover positioned to contact and magnetically couple the bottom cover to the hub and thereby couple the covers together, a handle pivotally mounted on the top cover for movement between an open and a closed position, and drive means adapted to be manually connected between the handle and the hub for moving the hub relative to the top cover away from the permanent magnets to afford separation of the covers upon manual movement of the handle to its open position, wherein the improvement comprises:

a centrally positioned projection on said bottom cover having an enlarged end adapted to pass through a central opening in the hub when said covers are mated or separated;

a latch assembly mounted centrally on said top cover and positioned for engagement by the projection, including a plurality of balls mounted therein for radial movement between inner engaged positions against the projection on the side of the enlarged end adjacent the bottom cover and outer release positions spaced from the projection to afford movement of the enlarged end therebetween;

cam means operably coupled to the drive means for moving said balls to their engaged positions when said handle is moved to its closed position, and for affording movement of the balls to their release positions when said handle is in its open position;

a pin tumbler lock mechanism including a key operated plug mounted in the top cover for rotation between locked and unlocked positions; and a bolt eccentrically coupled to the plug and mounted in the top cover for movement when the plug is rotated to its locked position into a position in engagement with the handle when the handle is in its closed position to prevent movement of the handle to its open position; and for movement when the plug is rotated to its unlocked position into a position spaced from the handle.

* * * * *